Nov. 28, 1967 A. GLANC 3,355,634
ELECTRIC CIRCUIT WITH A NON-LINEAR DIELECTRIC ELEMENT
Filed Oct. 23, 1963 3 Sheets-Sheet 1

INVENTOR.
ANTONIN GLANC
BY
Attorney

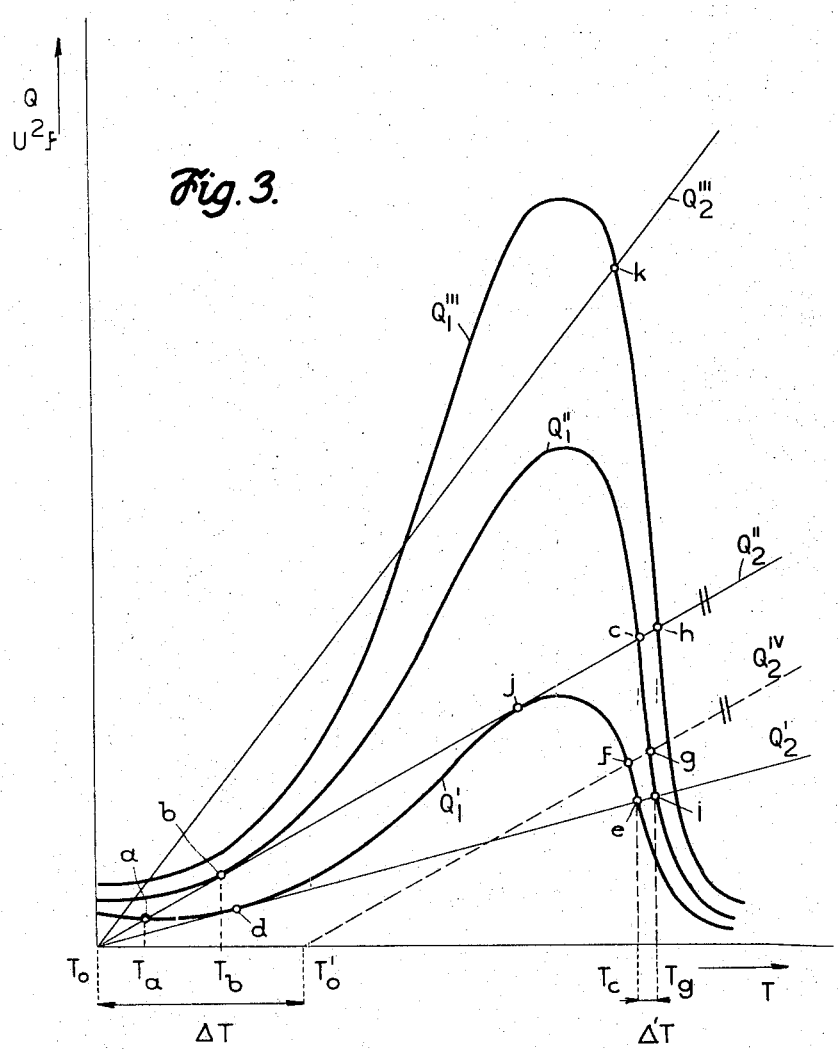

United States Patent Office 3,355,634
Patented Nov. 28, 1967

3,355,634
ELECTRIC CIRCUIT WITH A NON-LINEAR
DIELECTRIC ELEMENT
Antonín Glanc, Libochovice, Czechoslovakia, assignor to Ceskoslovenska akademie ved, Prague, Czechoslovakia, a corporation of Czechoslovakia
Filed Oct. 23, 1963, Ser. No. 318,302
Claims priority, application Czechoslovakia, Nov. 3, 1962, 6,228/62; Dec. 18, 1962, 7,115/62; Mar. 15, 1963, 1,473/63
3 Claims. (Cl. 317—231)

ABSTRACT OF THE DISCLOSURE

An electric circuit with a non-linear capacitor maintained by dielectric losses in a temperature autostabilized state within a region of its maximum non-linearities.

The invention relates to electric circuits comprising an element with a non-linear dielectric, that is a dielectric the permittivity or dielectric constant of which depends on the temperature or the voltage applied to an element with such a dielectric.

It is known that a non-linear dielectric attains its best properties only in the vicinity of a certain temperature which, in the case of ferroelectric materials, is referred to as Curie temperature. In the vicinity of this temperature, the voltage non-linearities of the dielectric are most noticeable, and above the Curie temperature the domain structure of the dielectric disappears, the latter being the main cause of the frequency limitations of the respective circuits and of their noise. Until now, it has been assumed that an additional source of heat would be necessary for heating up to the required temperature, and that the achieved temperature would have to be accurately stabilized to make the properties of the dielectric independent of variations of the ambient temperature or other external parameters or conditions. Because of this, existing electronic circuits with non-linear dielectrics have been operated as a rule and preferably sufficiently far away from the Curie temperature to eliminate the necessity of stabilizing this temperature. No proposition has so far been made to usefully employ the effect of the dielectric losses produced on a capacitor with a non-linear dielectric under the effect of a voltage applied from an external circuit. As far as this effect has been taken into account, for example, by M. Epstein-H. Wieder in "Capacitor Modulated Wide-Range F-M System," see Electronics No. 10/1953, pp. 190–192, only the negative side of the problem has been considered, that is the applied voltage has always been kept so low as to prevent dielectric heating which has been considered to affect adversely the properties of the dielectric. However, this invention is based on the fact that it makes intentional use of the effect of the voltage of an external circuit, and the dielectric heating resulting therefrom, on the properties of a non-linear dielectric.

It is an object of this invention to achieve with a dielectric operation in the vicinity of the Curie temperature and to stabilize the achieved temperature against temperature variations of the surrounding medium, or the supply voltage and the frequency thereof.

Another object of the invention is to improve by simple means the parameters or qualities of electronic circuits based on non-linear properties of the dielectric, that is, for example, to increase amplification in the case of a dielectric amplifier, or the converse gain in a frequency mixer, or the yield of higher harmonics in the case of a frequency multiplier, and to make possible the operation of such circuits even at very high frequencies which could not be achieved with existing dielectric circuits operating below the Curie temperature.

Dielectrics which may be used to achieve the objects of this invention and to realise the same are all the materials with a temperature region in which the dielectric losses are reduced if the temperature is increased. Many materials have already become known which may be used for this purpose, for example triglycine sulphate.

Briefly said, one aspect of the invention is an electric circuit with a non-linear dielectric element which may comprise known parts corresponding to the respective circuit, in which at least one non-linear dielectric element comprises a dielectric material whose imaginary component of the dielectric constant $\epsilon_2$ has a dropping characteristic, if the temperature in some temperature region is increased, this element being provided with means creating therein an alternating electric field, said means being connected to an alternating heating source whose voltage and frequency are adjustable separately or together in such a manner that the dielectric is heated by the produced dielectric losses to a temperature lying in the said temperature region of the dropping characteristic of the imaginary component of the dielectric constant $\epsilon_2$.

Another aspect of the invention is an electric circuit operating as a temperature stabilizer owing to the fact that a body made of a dielectric whose imaginary component of the dielectric constant $\epsilon_2$ has a dropping characteristic if the temperature is increased in the vicinity of the temperature which has to be stabilized, the said body being provided with means for dielectric heating into the said temperature region with a dropping characteristic of the imaginary component of the dielectric constant $\epsilon_2$ is located in the space whose temperature is to be stabilized.

Still another aspect of the invention is a known electric circuit operating as a dielectric amplifier comprising a resonant circuit whose capacity forms at least partially a non-linear capacitor fed with alternating voltage and with a signal voltage, and a demodulator, the non-linear capacitor having a dielectric in which the region with a dropping temperature characteristic of the imaginary component of the dielectric constant $\epsilon_2$ manifest increased non-linearities of the real component of the dielectric constant $\epsilon_1$ conveniently in the vicinity of the maximum, the source of the supply voltage being provided with means which allow adjustment of the dielectric heating of the dielectric of non-linear capacitors into the said temperature region.

The above mentioned electric circuits have a non-linear dielectric element with a dielectric consisting, for example, of triglycine sulphate.

The invention will be best understood from the following specification to be read in conjunction with the accompanying drawings showing examples of various embodiments. In the drawings:

FIG. 3 illustrates the temperature conditions in the dielectric;

It is known that the dielectric losses transformed into heat in a volume unit of any dielectric in a unit of time are given by the expression $$Q_1 = k \cdot \frac{\epsilon_2 U^2 f}{l^2} \quad (1)$$

the notation being:
$k$—constant,
$\epsilon_2$—the imaginary component of the dielectric constant,
$U$—effective value of the applied alternating voltage,
$f$—frequency of the above voltage,
$l$—thickness of the dielectric.

Note: The imaginary component of the dielectric constant $\epsilon_2$ is derived from the conception of complex dielectric constant $\epsilon$ with a real and an imaginary component $$\epsilon = \epsilon_1 - j\epsilon_2$$

the achieved real component $\epsilon_1$ corresponding to the conception of relative dielectric constant $\epsilon_r$ in accordance with the Georgi system of units and the ratio of the two components is the so called loss angle $$\frac{\epsilon_2}{\epsilon_1} = tg\delta$$

hence the imaginary component of the dielectric constant $$\epsilon_2 = \epsilon_1 tg\delta = \epsilon_r tg\delta$$

Figure 1:
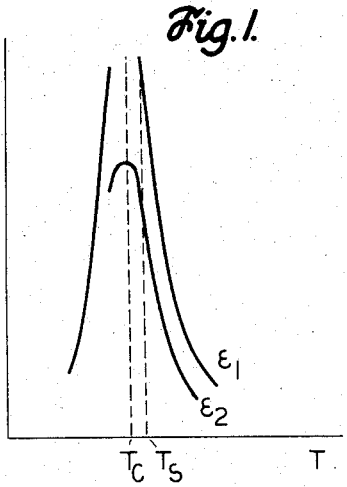
FIG. 1 illustrates the necessary dependence or relationship between dielectric losses and temperature.

It can be seen that with a given voltage and frequency the dielectric losses are proportional to the imaginary component of the dielectric constant $\epsilon_2$. In dielectrics which are applicable to embody the invention, the imaginary component of the dielectric constant $\epsilon_2$ must depend on the temperature in such a manner that it has a dropping characteristic over a certain temperature range. In the case of triglycine sulphate this requirement is met, as can be seen from FIG. 1 which illustrates how the imaginary component of the dielectric constant $\epsilon_2$ in the case of triglycine sulphate depends on the temperature T. The value $\epsilon_2$ is a maximum at the temperature $T_1$ in the vicinity of the Curie point $T_C$. The temperature $T_S$ represents the working point under conditions of the invention as will be explained below. The figure also shows the curve of the real component of the dielectric constant $\epsilon_1$ which has its peak just at $T_C$.

Figure 2:
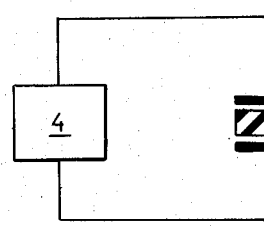
FIG. 2 illustrates the fundamental circuit arrangement in accordance with the invention.

In accordance with FIG. 2, the dielectric 1 with the mentioned properties is provided with electrodes 2 and 3, thus forming a capacitor connected to the source 4 of an alternating voltage $U_4$ of a frequency $f$. The alternating electric field in the dielectric 1 between the electrodes 2 and 3 causes dielectric losses. The source 4 will be referred to in what follows as the heating source.

Referring now more particularly to FIG. 3, the heating curves $Q_1'$, $Q_1''$, $Q_1'''$ illustrate the characteristics of the amount of heat released in a unit of time by the dielectric losses in a volume unit of the dielectric with the mentioned properties as a function of its temperature. The parameter of the curves is the product of the square of the applied voltage $U^2_4$ and its frequency $f$; the heating curve $Q_1'''$ corresponds to the highest product of the square of the voltage $U_4$ and of the frequency $f$, and the parts of the heating curves which drop steeply with temperature correspond to the region with the required dropping dependence of the imaginary component of the dielectric constant on temperature. To make the diagram more instructive, the curves have been drawn flatter than they actually are.

FIG. 3 also contains the cooling lines $Q_2'$, $Q_2''$, $Q_2'''$ which show as a first approximation the amount of heat which is led away into the surroundings in a unit of time from a volume unit of the dielectric in dependence on its temperature. This is shown for three different intensities of cooling. Intersection of all these lines with the horizontal axis occurs at the ambient temperature $T_0$. If the amount of heat developed for heating $Q_1$ is larger than the cooling heat $Q_2$ which is led away, the dielectric becomes heated. If the amount of the heat developed for heating $Q_1$ is smaller than the cooling heat $Q_2$ which is led away, there occurs cooling. If both amounts are equal, there occurs a balance at the points $b$ and $c$, assuming for example a development along the heating curve $Q_1''$, and leading-away of heat along the cooling line $Q_2''$; or at the points $a$ and $j$, assuming a development along the heating curve $Q_1'$ and the cooling line $Q_2''$. But only those parts are stable for which the condition $$\frac{dQ_1}{dT} < \frac{dQ_2}{dT} \quad (2)$$

is met.

This condition is met by the points $a$ and $c$, whereas at the point $b$ which does not meet the condition, any accidental temperature change is evidently increased. This point $b$ has an unstable condition of the thermal balance. If now the capacitor in accordance with FIG. 2 with a dielectric 1, having an initial temperature $T_0$ which coincides with the ambient temperature, is connected to an alternating heating source 4 with a power corresponding to the heating curve $Q_1'$ cooling taking place along the corresponding cooling line $Q_2''$, the dielectric is first heated to a temperature T corresponding to the point $a$ in FIG. 3 where further heating is stopped. But at this temperature the dielectric does not yet have the required properties and this condition must therefore be overcome; and the temperature of dielectric must be further increased. This can be achieved in three ways:

(a) Leaving the ambient temperature $T_0$ and the intensity of cooling $Q_2''$ unchanged, the power of dielectric heating is increased, for example, along the heating curve $Q_1'''$ in FIG. 3 whose lower bend at least touches the cooling line $Q_2''$ at the point $b$ where condition 2 is not met so that the temperature of the dielectric changes suddenly into point $c$ where its further increase is stopped.

(b) Leaving the ambient temperature $T_0$ and heating power $Q_1''$ unchanged, the cooling intensity of the dielectric is reduced, for example, along the line $Q_2'$. The point of contact is at $d$ in the first bend of the heating curve $Q_1'$ so that the stable temperature condition occurs at the point $e$.

(c) Leaving the heating power $Q_1'$ and cooling intensity $Q_2''$ unchanged, the ambient temperature $T_0$ is increased for example by $\Delta T$ to a value $T_0'$; this shifts the cooling line into position $Q_2^{IV}$ where there is no intersection or point of contact in the first bend of the heating curve $Q_1'$ so that the stable thermal condition occurs at the point $f$.

These three means can be arbitrarily combined. Their common feature resides in the fact that they tend to attain the unstable state of thermal balance where the cooling line $Q_2$ is at least just a tangent of the heating curve $Q_1$ in its first lower bend, as indicated by points $b$ and $d$, at the temperature $T_b$ and $T_a$ for the heating curves $Q_1'$ and $Q_1''$ and the cooling lines $Q_2'$ and $Q_2''$ where the temperature cannot be maintained. In this case heating prevails above cooling and the temperature of the body changes suddenly into the intersection of the dropping part of the heating curve, generally $Q_1$, with the cooling line $Q_2$. After overcoming the unstable point, heating for different parameters $Q_1$ and $Q_2$ is of course stopped at various points of the dropping parts of the heating curves $Q_1$. By suitable changes of the parameters of the regime or mode of operation it is possible to adjust in various manners this point at which heating is stopped.

Let us assume that the stable state corresponds to the intersection $c$ of the heating curve $Q_1''$ with the cooling line $Q_2''$. The respective temperature $T_C$ of the dielectric 1 is stabilized against variations of the ambient temperature, as can be seen from the fact that if the ambient temperature $T_o$, is increased by $\Delta T$ to a value of $T_o'$ the temperature of the dielectric 1 is increased to a value $T_g$ only by a small difference $\Delta'T$, as corresponds to the intersection $g$ of the heating curve $Q_1''$ with the cooling line $Q_2^{IV}$. The temperature of the dielectric 1 is also stabilized against variations of the voltage $U_4$, or of the frequency $f$ of the alternating heating source 4; this is obvious from the fact that if heating is increased from a value corresponding to the curve $Q_1''$, with the original ambient temperature $T_o$ remaining unchanged, to a value corresponding for example to the curve $Q_1'''$, the intersection $c$ is shifted only a little distance into point $h$. Also, a chain of the cooling intensity, for example, from curve $Q_2''$ to $Q_2'$, changes the position of the point $c$ to position $i$, the temperature change of the dielectric being small.

If all the parameters of the mode of operation are changed simultaneously in the region with the temperature of the dropping sections of the heating curves $Q_1$, the range of temperature stabilization $\Delta'T$ of the dielectric 1 will be approximately maintained.

Hence, in the region of the dropping characteristic of the dielectric losses as a function of the temperature of the dielectric 1 achieves stabilization of the temperature of the dielectric, and thus also independence of its electric properties with regard to the ambient temperature. This condition which corresponds generally to point $T_S$ in FIG. 1 will be referred to in what follows as "autostable." It is attached with the intersections of all imaginable cooling lines $Q_2$ with all achievable heating curves $Q_1$ in their dropping part, for example points $c$, $e$, $f$, $g$, $h$, $i$, $k$.

It is yet necessary to describe one limit case which corresponds to the condition at point $j$ which is the point of contact of the cooling line $Q_2''$ and the heating curve $Q_1'$ in the vicinity of the peak. Let us consider the starting condition or state at point $d$ corresponding to heating magnitude $Q_1''$ and cooling intensity $Q_2''$ at the ambient temperature $T_o$. If the heating power is reduced, the shape of the corresponding curve $Q_1$ becomes flattened and point $c$ is shifted along the cooling line $Q_2''$ towards lower temperatures. The autostable state continues as long as the requirement 2 is met. However, as soon as the heating curve is changed to position $Q_1'$, the intersection $c$ is changed into the point of contact $j$ where the requirement 2 is not met, and the temperatures of the dielectric is suddenly reduced along the heating curve $Q_1'$ until its lower intersection with the cooling line $Q_2''$, marked $a$.

In the following description of the function of the device in accordance with the invention it will be useful to generalize the reference symbols of some of the above described points. Points with a stable thermal balance in the first lower bend of any heating curve $Q_1$ will be marked $a$, autostable points will be marked $c$, unstable points of contact in the lower bend will be marked $b$ and the peak of the heating curves $Q_1$ will be marked $j$. In all other respects the reference symbols of FIG. 3 will be respected.

Figure 4:
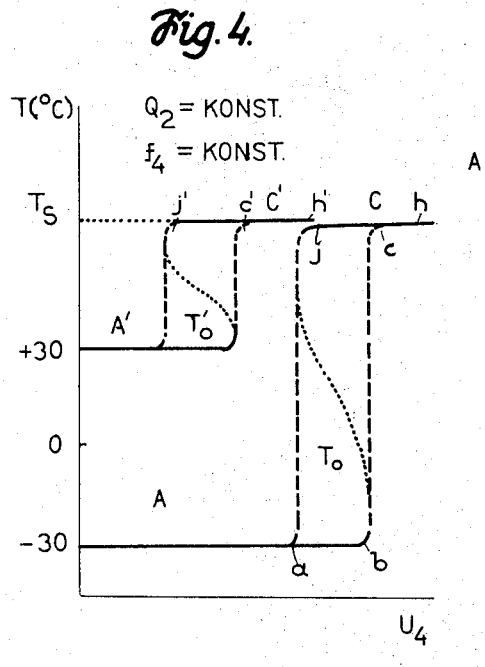
FIG. 4 illustrates the achieved temperature stabilization of the dielectric.

FIG. 4 shows the obtained temperature stabilization by the diagram of the dielectric temperature characteristic as a function of the voltage $U_4$ of the heating source 4 which is applied to the dielectric 1 in the circuit arrangement of FIG. 2. The heating voltage $U_4$ is plotted on the horizontal axis and the dielectric temperature $T$ is plotted on the vertical axis. The curves are shown for the given dielectric 1, a stable frequency $f$ and a stable cooling intensity $Q_2$ of the dielectric 1. The ambient temperature $T_o$ is the parameter of the curves. Two curves have been shown, one for an ambient temperature $T_o$, and the second for a higher ambient temperature $T_o'$. In the initial condition at $U_4=0$, the dielectric temperatures are balanced with the ambient temperature, as can be seen from the starting points $T_o$, $T_o'$ in FIG. 4.

If the voltage $U_4$ on the dielectric 1 is increased under the given conditions from zero continually and sufficiently slow so that the heating of the dielectric 1 can follow the increase of the voltage $U_4$, the temperature of the dielectric 1 increases below the stable branch A of the curve with the parameters $T_o$ in FIG. 4. This heating corresponds analogically for example to a shift of point $a$ along the respective part of the cooling line $Q_2''$ below the lower bend of the heating curve $Q_1'$, according to FIG. 3, if the position thereof is increased towards higher values of the heating parameter $Q_1$. As soon as point $a$ achieves the character of an unstable point $b$, the temperature of the dielectric 1 jumps over to point $c$ corresponding to the stabilized temperature $T_S$. This temperature is kept by the dielectric approximately at a constant value even if the voltage $U_4$ is further increased in the direction towards point $h$ on branch $c$ of the dielectric 1. If the voltage is reduced, the temperature returns to point $c$ after which it drops slightly down to point $j$ which is unstable. Therefore, it drops suddenly from this point down to the point $a$. The measured characteristic corresponds to the preceding description of FIG. 3. For the higher ambient temperature $T_o'$, the shape of the characteristic is very close to the shape of the temperature characteristic at the temperature $T_o$. But the unstable states appear at a lower temperature $U_4$ which also corresponds to the description of FIG. 3. For the second curve the points are designated with stroked letters to distinguish them from similar letters of the first curve. The temperature in the autostable state is approximately the same for both ambient temperatures $T_o$ and $T_o'$.

This result shows that the circuit arrangement in accordance with the invention can be conveniently used for temperature stabilization or as a temperature standard. It is sufficient to place the dielectric with the required temperature dependence of the imaginary component of the dielectric constant into an alternating electric field of such intensity and frequency to allow the produced dielectric losses to heat the body into the region $T_S$. This can be achieved most easily in accordance with FIG. 2 by means of electrodes 2, 3. But in principle, the dielectric 1 itself may be placed in an alternating field produced by means which are located outside the dielectric elements themselves.

Still more important than the applications in the field of thermal technics are the electronic applications based on the fact that the stabilized temperature $T_S$ lying close above the Curie point $T_C$ corresponds in ferroelectric materials to the region in which these materials have the greatest non-linearity of the dependence between the supplied electric charge and the applied voltage, that is the region of the largest change of the real component of the dielectric constant $\epsilon_1$. This makes possible the construction of dielectric amplifiers, modulators, frequency multipliers and other similar circuits which do not differ from known circuit arrangements, but still achieve much better parameters, that is amplification or converse gain, than circuits operating without heating. Such circuits must of course correspond to FIG. 2, that is they should comprise at least one element with a non-linear dielectric 1 which may be connected, if required, by further means, see the example illustrated in FIG. 5, to a heating source 4 whose voltage and frequency are selected in such a manner that there takes place dielectric heating of the non-linear dielectric 1 into the autostable state, in the region of the dropping part of the curve of the imaginary component of the dielectric constant as a function of the temperature of the dielectric 1. Since in this region which lies close above the Curie point $T_C$, the domain structure of the ferroelectric and the noise produced by the changes of its switch effect disappear, and it is possible, in accordance with the invention, to reach, at the same time, a widening of the frequency region and a reduction of the noise factor. This is also in common with the fact that the dielectric element in accordance with the invention operates mostly as a capacity.

Figure 5:
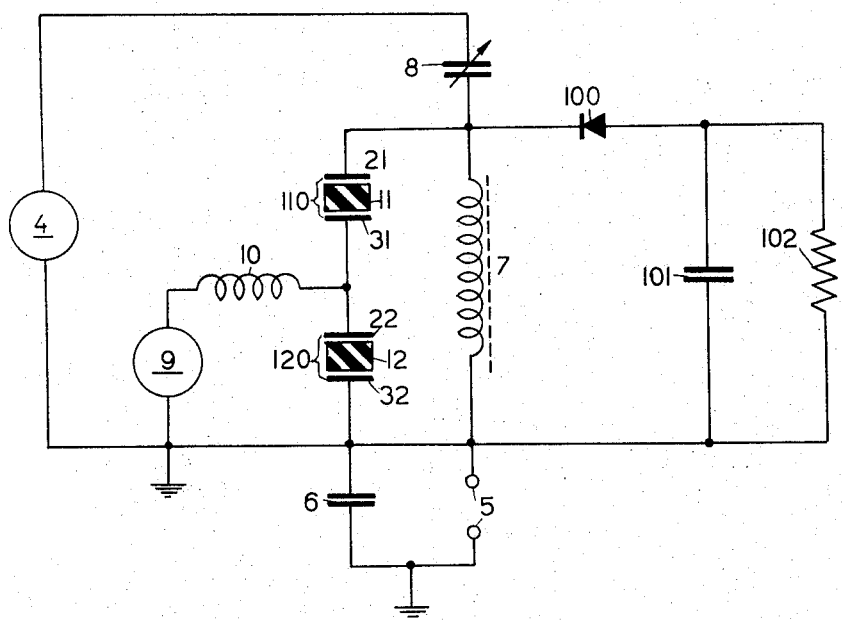
FIG. 5 is the circuit arrangement of a dielectric amplifier allowing application of the invention.

As compared with the example of FIG. 2, the actual arrangement of the various circuits comprises further components which are necessary for the respective circuits but are not essential for the operation of the invention proper; that is, they change nothing in connection with the dielectric heating of a non-linear dielectric into the autostable state. As a proof of these properties, FIG. 5 shows a dielectric amplifier of known arrangement, the notation being:

| | |
|---|---|
| 11, 12 | Non linear dielectric. |
| 21, 22, 31, 32 | Electrodes forming with the dielectric capacitors 110, 120. |
| 4 | Supply source of HF voltage; in mode of operation according to the invention also heating source. |
| 5 | Terminals for the supply of a DC polarization voltage. |
| 6 | Capacitor which blocks source 5. |
| 7 | Inductance of the resonant circuit. |
| 8 | Capitor for adjusting the voltage $U_4$ applied to the dielectric 11, 12. |
| 9 | Signal source. |
| 10 | Separating choke. |
| 100 | Rectifying diode. |
| 101, 102 | Rectifying RC-member. |

This amplifier operates in a known manner: The inductance 7 forms together with the non-linear capacitors 110, 120 a resonant circuit which is tuned in such a manner that without a signal from source 9, as long as there is on the capacitor only the polarization voltage from source 5, the frequency of the HF supply source 4 lies on the flank of the resonance curve 7, 110, 120. If a signal is supplied from source 9 for amplification, the instantaneous polarization voltage is either increased or decreased at the rhythm of the signal and the capacity of the capacitors 110, 120 is changed at the same rhythm. This causes the resonance curve of the circuit to be shifted in the direction towards higher or lower frequencies which cause amplitude modulation of the high-frequency voltage across the circuit 7, 110, 120. This voltage is rectified by means of diode 100 so that a demodulated signal is created across member 101, 102. This signal is therefore amplified by the input signal.

In accordance with the known state of art, the HF supply voltage across capacitors 110, 120 has to be so small as to avoid heating of the dielectric 11, 12 of these capacitors. Therefore, the dielectric operates in the region of relatively small voltage non-linearities so that the efficiency of modulation, and thus also the obtained amplification, is small; moreover, the function of the amplifier is limited to relatively low frequencies and it suffers from temperature non-stabilities.

Figure 6:
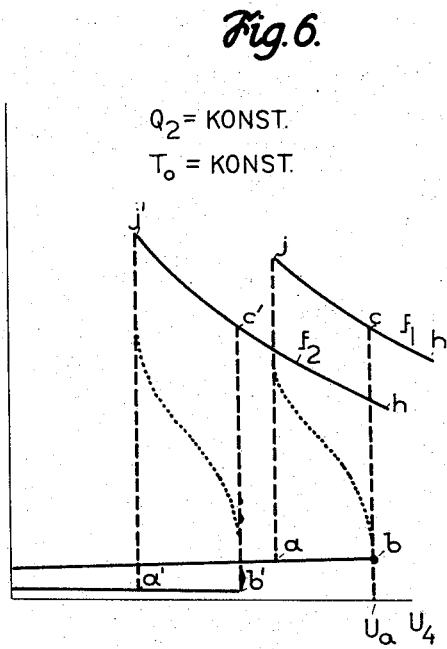
FIG. 6 illustrates the gain increase achieved by the invention in the dielectric amplifier of FIG. 5.

In accordance with the invention it is sufficient to increase the voltage $U_4$ or the frequency $f$ of the HF source 4 in such a manner that the produced dielectric heating brings the dielectric 11, 12 with properties in accordance with the invention into the autostable state, and thus also into the region of large voltage non-linearities; this increases the voltage amplification of the amplifier by one order due to increased non-linearities; moreover, the effect of the limiting frequency dependence is stopped. Due to this fact it is possible to amplify with this circuit arrangement even very high frequencies where this has not been possible until now. The result can be seen from the diagram of FIG. 6 which represents the amplification A achieved by the circuit arrangement according to FIG. 5 with a dielectric according to the invention, as a function of $U_4$ of the heating source 4. The amplification A is plotted on the vertical axis, the heating voltage $U_4$ on the horizontal axis. Two characteristics have been plotted, their parameter being the frequency of the amplified signal. The curves were measured at a constant cooling intensity of the dielectric $Q_3$=const., at an ambient temperature $T_0$=const., and at the frequency $f$ of the heating source 4. The frequency of the amplified signal was of the order $f_1$=10 kc./sec., $f_2$=1 mc./sec. The character of the amplification characteristic corresponds to the character of the characteristic of the diagram of the temperature stability in FIG. 4. The corresponding points are therefore marked with identical letters. The curvature of the branch $j$-$c$-$h$ or $j'$-$c'$-$h'$ is due to the fact that at the temperature of the dielectric in accordance with the invention 11, 12 in the vicinity of the Curie temperature $T_c$ the voltage non-linearities of the dielectric are largest in the section $c$-$j$. The section $c$-$h$ corresponds to dielectric temperatures at which the values of the electric non-linearities drop steeply with a rising temperature, and also with an applied heating voltage $U_4$. See FIG. 1 for the mutual position of the curves $\epsilon_1$ and $\epsilon_2$, as a function of the dielectric temperature; in the present case triglycine sulphate. It is also obvious that the best mode of operation of the non-linear element in accordance with the invention as an amplifier corresponds to point $k$ in FIG. 3 whose autostable temperature $T_0$ is very close to the Curie temperature $T_c$. The curves show that in the non-heated state, outside the auto-stable mode of operation, the amplification A is very small; it is practically unmeasurable for an amplified frequency of the order of mc./sec. In the autostable state within the limits of the points $j$-$c$-$h$ it is large and practically constant over a wide frequency band. It is obvious that the known amplifier circuit operated in the way indicated by the invention has unexpected and substantially higher effects.

The dielectric amplifier has been shown only as a typical example of applying the invention without limiting its full scope. The invention can also be applied equally well in other electronic circuits such as modulators, generators of harmonics, mixers and the like.

In various circuits in accordance with the invention it is necessary to find out in a simple manner whether the dielectric 1 has already been brought into the autostable state at the temperature $T_s$. The value of the necessary heating voltage $U_4$ depends on many different requirements, such as the magnitude and cooling conditions of the element, on the steepness of the drop of $\epsilon_2$, on the frequency of the voltage and the like, so that the necessary voltage cannot be ascertained by simple means in advance. In physical respect, achievement of the autostable state is manifested by the fact that the temperature $T_s$ of the dielectric 1 is stabilized against changes of the ambient temperature $T_o$ or the heating supply voltage $U_4$ and its frequency $f$, as has already been explained in connection with FIGS. 2 and 3. Another proof is disappearance of the hysteresis loop in the polarization characteristic of the dielectric. But these phenomena can only be measured with difficulty and they are therefore not used in current indication.

A simple and easier method of ascertaining the autostable state resides in the fact that the capacity of the element 1, 2, 3 is increased by cooling, whereas outside the autostable state the capacity is reduced by cooling. Capacity changes can already be easily indicated in electronic circuits, for example, in accordance with the magnitude of the voltage on the non-linear element. Therefore, if the non-linear dielectric element is connected to the heating source 4 through the usual capacitor 8 which serves for adjusting the heating, the capacity of the element is temporarily increased by cooling, for example, by blowing upon this element, and the voltage thereacross is therefore reduced whereas below the autostable state the capacity is reduced by blowing and the voltage is increased. In accordance with the employed circuit other values than the capacity may also be used for indication, such as the change of the resonant frequency of the circuit, the magnitude of amplification of the yield of higher harmonics; all these parameters change suddenly if the autostable state is reached. They give therefore a reliable and simple criterion as to whether the circuit operates in the autostable state according to the invention.

What I claim is:

1. An electric circuit comprising at least one capacitor having a pair of electrodes and a ferroelectric dielectric, said dielectric made of a material including means for producing a characteristic non-linear ratio of decreasing permittivity with increasing temperature over a range above the Curie point of said material, a source of alternating heating current connected to said electrodes, said dielectric including means responsive to said heating current for maintaining said dielectric in an equilibrium state of dielectric losses with heat dissipation at a temperature autostabilized state, said dielectric having a region of maximum non-linearities of permittivity in a range of temperature above said Curie point, and means for adjustment of said heating current for maintaining said dielectric within said region.

2. An electric circuit as defined in claim 1 wherein said dielectric is made of triglycine sulphate.

3. An electric circuit as defined in claim 1, and further comprising variable capacitor means connected between said capacitor and said source for allowing adjustment of the temperature state of said capacitor.

References Cited

UNITED STATES PATENTS

| | | | |
|---|---|---|---|
| 2,611,039 | 9/1952 | Hepp | 317—258 |
| 2,848,563 | 8/1958 | Scorgie | 330—7 |
| 2,901,679 | 8/1959 | Matthias | 317—258 |
| 2,922,959 | 1/1960 | Holloway et al. | 330—7 |
| 3,101,452 | 8/1963 | Holcomb et al. | 330—7 |
| 3,210,607 | 10/1965 | Flanagan | 317—262 |
| 3,274,567 | 9/1966 | Fatuzzo | 317—258 |

JAMES D. KALLAM, *Primary Examiner.*

NATHAN KAUFMAN, *Examiner.*